(12) United States Patent
Kayser

(10) Patent No.: US 8,302,799 B2
(45) Date of Patent: Nov. 6, 2012

(54) CONTAINER FOR INSTALLATION IN THE INTERIOR OF A MOTOR VEHICLE

(75) Inventor: Martin Kayser, Leonberg (DE)

(73) Assignee: Dr. Ing. h.c.F. Porsche AG (DE)

( * ) Notice: Subject to any disclaimer, the term of this patent is extended or adjusted under 35 U.S.C. 154(b) by 808 days.

(21) Appl. No.: 12/359,519

(22) Filed: Jan. 26, 2009

(65) Prior Publication Data

US 2009/0188934 A1 Jul. 30, 2009

(30) Foreign Application Priority Data

Jan. 25, 2008 (DE) .......................... 10 2008 006 102

(51) Int. Cl.
*B65D 43/20* (2006.01)
*B65D 41/02* (2006.01)

(52) U.S. Cl. ......... 220/348; 220/264; 220/283; 220/827

(58) Field of Classification Search ................... 220/264, 220/283, 825, 827, 213, 345.3, 345.4, 348; 296/24.34; 224/282, 483
See application file for complete search history.

(56) References Cited

U.S. PATENT DOCUMENTS

| 4,538,844 | A | * | 9/1985 | Watanabe | 292/127 |
| 5,144,963 | A | | 9/1992 | Dabringhaus et al. | |
| 5,209,016 | A | * | 5/1993 | Yamada | 49/193 |
| 6,311,866 | B1 | * | 11/2001 | Sambonet et al. | 220/830 |
| 6,409,136 | B1 | | 6/2002 | Weiss et al. | |
| 6,431,391 | B1 | | 8/2002 | Kaupp | |
| 6,669,243 | B2 | * | 12/2003 | Katoh et al. | 292/34 |
| 6,698,334 | B2 | * | 3/2004 | Brown | 99/339 |
| 6,857,675 | B2 | * | 2/2005 | Hayashi et al. | 296/37.12 |
| 7,025,225 | B2 | * | 4/2006 | Inari | 220/830 |
| 7,063,225 | B2 | * | 6/2006 | Fukuo | 220/264 |
| 7,125,063 | B2 | * | 10/2006 | Kawamoto et al. | 296/37.8 |
| 7,231,692 | B2 | * | 6/2007 | Harada | 16/345 |
| 7,243,472 | B2 | * | 7/2007 | Taemmerich | 52/716.6 |
| 7,487,884 | B2 | * | 2/2009 | Kim | 220/827 |
| 7,621,419 | B2 | * | 11/2009 | Fukuo | 220/264 |
| 2005/0023280 | A1 | * | 2/2005 | Kondo | 220/263 |

(Continued)

FOREIGN PATENT DOCUMENTS

DE 20002290 U1 4/2000

(Continued)

OTHER PUBLICATIONS

German Patent and Trademark Office Search Report, dated Oct. 29, 2008.

*Primary Examiner* — Anthony Stashick
*Assistant Examiner* — Brett Edwards
(74) *Attorney, Agent, or Firm* — Gerald E. Hespos; Michael J. Porco

(57) ABSTRACT

A container for installation in a vehicle has a housing and a lid mounted pivotably on the housing and connected operatively via a gear to a spring device prestressing the lid in an opening direction and supported on the housing. A cardiod control moves and locks the lid. It is in this case important that the cardiod of the cardiod control is disposed continuously on an outer circumference of a shaft having the spring device and co-operates with a movable pin arranged on the housing side.

12 Claims, 3 Drawing Sheets

U.S. PATENT DOCUMENTS

| | | | |
|---|---|---|---|
| 2005/0252759 A1* | 11/2005 | Ichimaru | 200/523 |
| 2007/0108785 A1* | 5/2007 | Reischer et al. | 296/24.34 |
| 2009/0188934 A1* | 7/2009 | Kayser | 220/827 |
| 2010/0282749 A1* | 11/2010 | Forrester | 220/262 |

FOREIGN PATENT DOCUMENTS

| | | |
|---|---|---|
| DE | 199 35 144 A1 | 2/2001 |
| DE | 10251813 A1 | 7/2004 |
| DE | 100 14 783 B4 | 3/2005 |
| DE | 103 02 478 B4 | 7/2006 |
| DE | 10 2005 039 266 A1 | 3/2007 |
| EP | 0483590 A1 | 5/1992 |
| EP | 0 760 309 B1 | 10/1999 |
| EP | 1 188 611 A1 | 3/2002 |

* cited by examiner

CONTAINER FOR INSTALLATION IN THE INTERIOR OF A MOTOR VEHICLE

CROSS-REFERENCE TO RELATED APPLICATION

This application claims the priority, under 35 U.S.C. §119, of German application DE 10 2008 006 102.6, filed Jan. 25, 2008; the prior application is herewith incorporated by reference in its entirety.

BACKGROUND OF THE INVENTION

Field of the Invention

The invention relates to a container for installation in the interior of a motor vehicle. The container has a housing and a lid which is mounted pivotably on the housing and which is connected operatively via a gear to a spring device prestressing the lid in an opening direction and supported on the housing. A cardioid control is provided for moving and locking the lid. The invention relates, moreover, to a motor vehicle equipped with a container of this type.

Published, non-prosecuted German patent application DE 199 35 144 A1, corresponding to U.S. Pat. No. 6,409,146, discloses a generic container in the manner of a beverage container which can be accommodated, for example, in the center console of a motor vehicle. The container in this case has a flat housing with two lids which are pivotable on the latter and between which the beverage container, for example a beverage can, a tumbler or a cup, can be set and at the same time is held by the two lids. To interlock the two lids, for example, a push-push mechanism or a cardiod control may be used.

A further container for installation in the interior of a motor vehicle is known from German patent DE 103 02 478 B4. An interlocking of a pivotable spring-loaded cover flap takes place in this case via a pushbutton arranged on the cover flap.

Further storage compartments which can be installed, for example, in a center console of a motor vehicle are known, for example, from German patent DE 100 14 783 B4, from European patent EP 0 760 309 B1 and from German utility model DE 200 02 290 U1.

Particularly in the case of containers in motor vehicles, cardioid locking mechanisms, as they are known, are used, in which, by a brief pressure on a lid mounted pivotably on the container, the locking device is released and the lid can swing up by spring actuation. When the lid is being closed, this is moved counter to the spring prestress, a pin being moved along a cardioid. In general, in this case, cardioid locking devices of this type often have a complicated configuration in structural terms.

It is accordingly an object of the invention to provide a container for installation in the interior of a motor vehicle that overcomes the above-mentioned disadvantages of the prior art devices of this general type, which is improved or at least a different embodiment which is distinguished, in particular by a cardioid control or cardioid locking which has a structurally simple configuration.

With the foregoing and other objects in view there is provided, in accordance with this invention, a container for installation in an interior of a motor vehicle. The container contains a gear, a spring device, a shaft having an outer circumference and supporting the spring device, a movable pin, a housing and a lid mounted pivotably on the housing and connected operatively via the gear to the spring device prestressing the lid in an opening direction and supported on the housing. A cardioid control is provided for moving and locking the lid. The cardioid control has a cardioid disposed continuously on the outer circumference of the shaft and co-operates with the movable pin disposed on a housing side.

The invention is base on the general idea of providing, in the case of a container with a housing and a lid for installation in the interior of a motor vehicle, a cardioid control for moving and locking the lid, in which the cardioid is not disposed on a planar surface, as has been customary hitherto and is known from the prior art, but, instead, on an outer surface area of the shaft. The cardioid disposed in this way co-operates in this case with a movable pin disposed on the housing side and thereby causes the locking and the unlocking of the lid belonging to the container. An opening movement of the lid mounted pivotably on the housing of the container is in this case assisted via a spring device which is supported on the housing and which has the effect that, by brief pressure on the lid of the container, is unlocked and is moved into its open position by the spring force of the spring device. By virtue of the cardioid according to the invention, disposed on the outer circumference of the shaft, a complete locking mechanism based on this principle can be configured in a markedly simpler way in structural terms, with the result that the production costs of a locking mechanism of this type also fall and, in particular, make is seem possible even for applications in low-priced segments. The arrangement of the cardioid on the outer circumference of the shaft is in this case extremely simple, since the shaft is produced, for example, as a plastic injection molding, and the cardioid disposed on the outer circumference of the shaft is produced simultaneously with the shaft in one production step, that is to say, in particular, is injection-molded together with this. In the case of a shaft formed from metal, it is conceivable that the cardioid is glued or welded to the outer circumference of the shaft, so that a fully standardized shaft can be used.

Expediently, at least one longitudinal end of the shaft, a gearwheel is provided which is connected fixedly in terms of rotation to the latter and which meshes with a toothed quadrant arranged on a lid leg. By co-operation between the toothed quadrant located on the lid-leg side and the shaft-side gearwheel, a gear can be implemented, which, for example, executes, damped, an opening movement of the lid which is assisted by the spring device. Damping of this type immediately signals to a vehicle occupant that a container of very high quality has been installed in the motor vehicle, since opening movements damped in this way are usually to be found only in high-priced segments. A similar damping of the lid may be achieved, for example, by what is known as a "silicone brake".

In a further advantageous embodiment of the solution according to the invention, an adjusting device, in particular an adjusting screw, for the tolerance compensation of the pin disposed on the housing side and co-operating with the cardioid is provided. An adjusting device of this type makes it easier, in particular, to carry out a fine adjustment of the pin which is usually carried out or checked during a final assembly quality control. The adjusting device in this case enables an assembly employee to adjust the pin by use of simple tools and a few manipulations in such a way as to make it possible to have fault-free functioning, that is to say, in particular, a fault-free opening and closing of the lid disposed pivotably on the housing.

In a further advantageous embodiment of the solution according to the invention, the container is configured as a beverage container, as a storage compartment or as an ashtray. Even this list shows that the container according to the invention, having the structurally novel cardioid control, can be transferred to virtually any desired applications and thereby enjoys a broad range of use.

Other features which are considered as characteristic for the invention are set forth in the appended claims.

Although the invention is illustrated and described herein as embodied in a container for installation in the interior of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
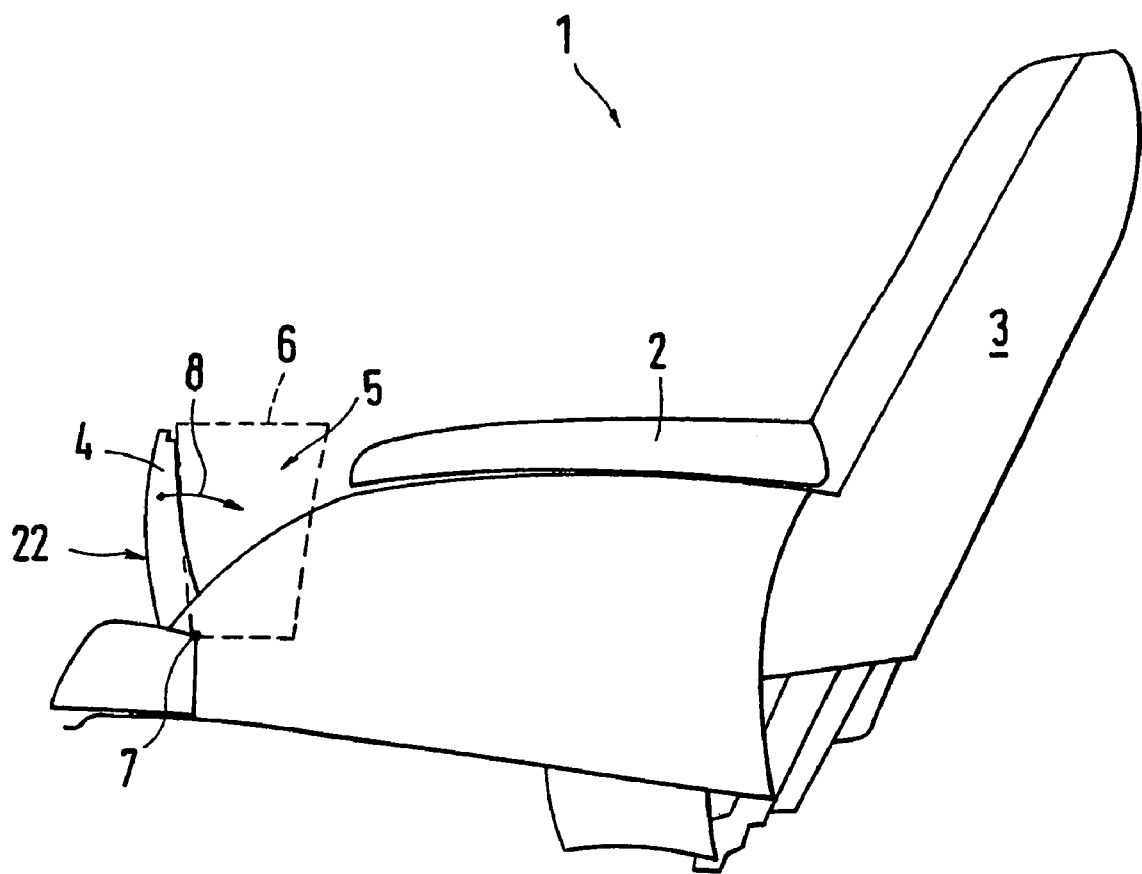
FIG. 1 is a diagrammatic, side view of a motor vehicle seat with a container according to the invention.

Referring now to the figures of the drawing in detail and first, particularly, to FIG. 1 thereof, there is shown a seat 1, in particular a motor vehicle seat, that has a lateral armrest 2 and a backrest 3. In a front region of the armrest 2, a pivotably mounted lid 4 is provided, which can close a container 5, in this case a container for a beverage tumbler 6 illustrated merely by a brokenly depicted line. According to FIG. 1, in this case, the lid 4 is illustrated in its open position, while, in its closed position, it bears against a side part of the seat 1 and in this case runs generally in alignment with the armrest 2. A closing movement of the lid 4 in this case takes place by a rotation or pivoting of the latter about a pivot axis 7, with the result that the lid 4 is pivoted along arrow 8. Of course, the container illustrated according to FIG. 1 is to be understood merely as an example, and therefore other containers, such as, in particular, a storage compartment or an ashtray, which can likewise be closed by the lid 4, are likewise to be covered by the invention. A container housing 9, also belonging to the container 5, is illustrated only in FIG. 2 and in FIG. 1 is concealed by the lateral armrest 2.

Figure 2:
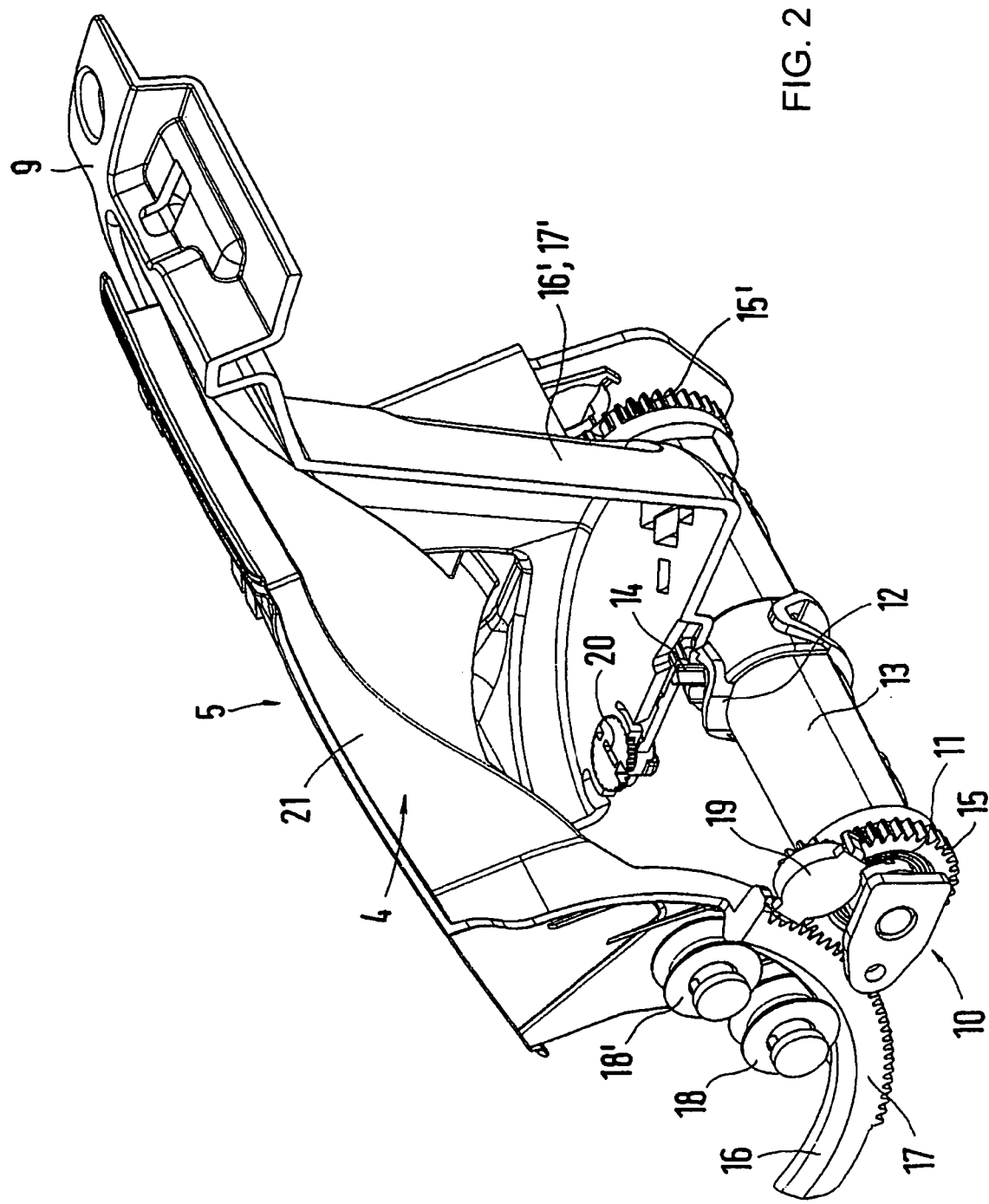
FIG. 2 is a diagrammatic, perspective view of the container with a cardiod control according to the invention.

The lid 4 is connected operatively via a gear 10 to a spring device 11 which prestresses the lid 4 in the opening direction, that is to say opposite to the direction of the arrow 8, and which is supported on the housing 9 (FIG. 2). The container 5 likewise includes a cardioid control 12 for moving and locking the lid 4, which cardioid control 12 is arranged continuously on an outer circumference of a shaft 13 having the spring device 11 (see in particular, FIG. 3). The cardioid control 12 of the container 5 in this case co-operates with a movably configured pin 14 arranged on the housing side. During an opening or closing movement of the lid 4, the pin 14 in this case runs within the cardioid 12 and is consequently guided by the latter. A cardioid control 12 of this type is popularly also designated as a push-push locking mechanism. The designation is due, in particular, to the fact that, to open the lid 4, the lid first has to be pressed at least slightly in its closing direction, in order to release the locking mechanism and thereby afford the spring device 11 the opportunity of moving the lid 4 in its opening direction. According to the invention, in this case, the cardioid 12 is disposed continuously on the outer circumference e of the shaft 13, not on a planar surface, as has been known hitherto from the prior art. Such an arrangement or configuration of the cardioid control 12 will, in particular, simplify the locking mechanism in structural terms and consequently make it more cost-effective.

The spring device 11 may have, for example, a torsion spring which is supported at one end on the shaft 13 and at the other end on the housing 9 or on an axle arranged co-axially within the shaft 13 and fixed to a housing. Torsion springs of this type can be produced extremely cost-effectively, and therefore this component of the container 5 can also have a cost-effective configuration.

Figure 3:
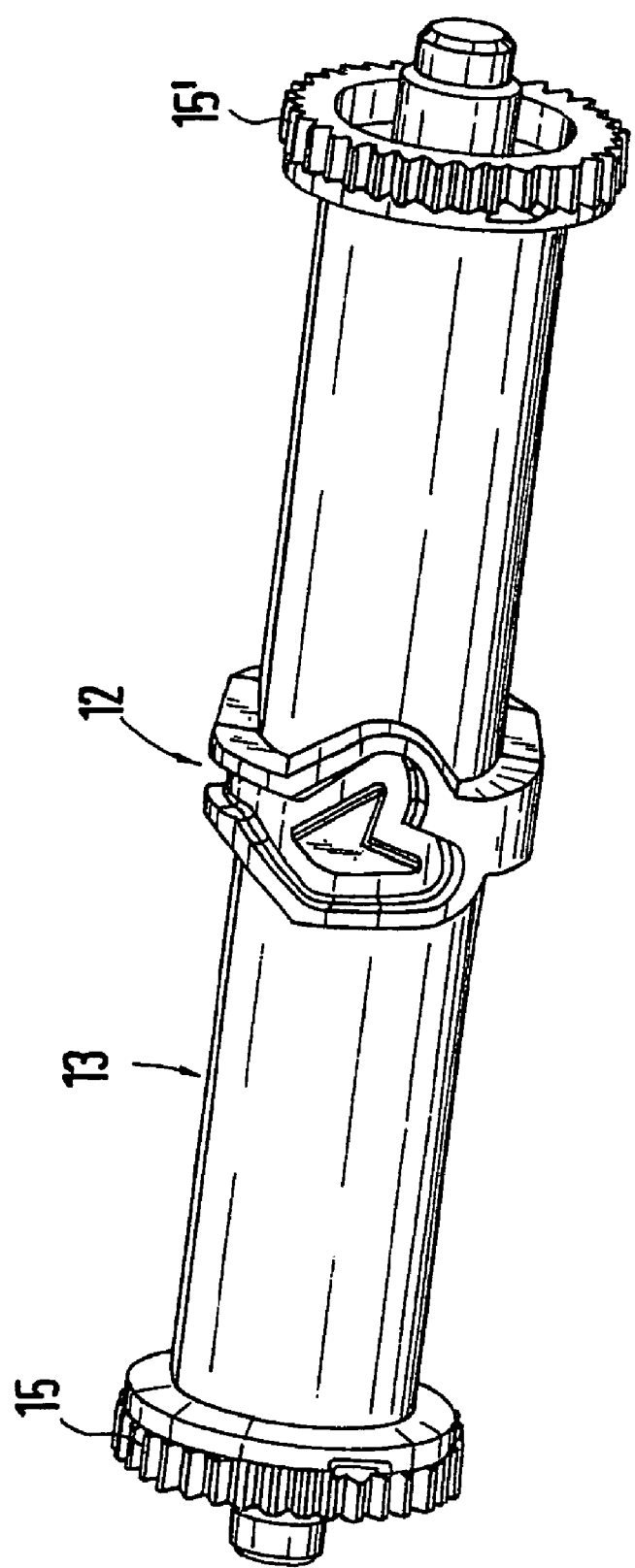
FIG. 3 is a diagrammatic, perspective view of a shaft with a cardiod disposed on its outer circumference.

As may be gathered from FIGS. 2 and 3, at each of the two longitudinal ends of the shaft 13 a gearwheel 15 and 15' is provided, which is connected fixedly in terms of rotation to the shaft 13 and which meshes with a toothed quadrant 17 or 17' disposed on a lid leg 16 or 16'. The lid leg 16 illustrated according to FIG. 2 is in this case of a curved configuration and is guided, on the one hand, by the shaft-side gearwheel 15 and, on the other hand, by two housing-side guide rollers 18 and 18'. This makes it possible to have an especially exact guidance of the lid leg 16 and, on the other side, likewise of the lid leg 16', as a result of which, in particular, an especially accurate opening or closing movement of the lid 4 can be achieved.

With the lid 4 open, the spring device 11 within the shaft 13 is in the virtually relaxed state and, when the lid 4 is being closed, is tensioned via the rotational movement exerted by the lid legs 16 and 16' and transmitted to the shaft 13. To open the lid 4, an at least slight force must be applied to the latter in the closed state in the direction of the arrow 8, with the result that the housing-side pin 14 is moved further along the cardioid 12 and the lid 4 can then be unlocked. During the opening of the lid, the spring device 11 brings about a torsional moment which acts on the shaft 13 and which is transmitted via the gearwheels 15 and 15' to the associated lid legs 16 and 16' of the lid 4 and thereby moves the latter in its opening direction. In this case, depending on the configuration of the gear 10, a damping effect of the opening movement of the lid 4 can also be achieved, this usually being considered by consumers as a remarkable feature of high quality. It is in this case also conceivable, of course, that, for damping the opening movement of the lid 4, a silicone brake 19 is provided which, for example via friction, damps the force acting on the lid 4 from the spring device 11. The silicone brake 19 is in this case likewise merely an example of a damping element which per se has any desired configuration.

So that the opening and closing movement of the lid can be set especially exactly, an adjusting device 20, in particular an adjusting screw, for the tolerance compensation of the pin 14 arranged on the housing side and co-operating with the cardioid 12 is provided. An adjusting device 20 of this type, for example, enables an employee, during a final assembly quality control of the container 5 according to the invention, to set exactly the co-operation between the pin 14 and the cardioid control 12 and thereby implement a particularly low-friction and consequently high-quality opening and closing movement. The lid 4 in this case has a carrier 21, preferably produced in one piece with the lid legs 16 and 16', and a decorative element 22 (see FIG. 1) connectable, in particular snappable, to the carrier 21. In this case, the carrier 21 is preferably produced as a standardized component to which the most diverse possible decorative elements 22 can be fastened, depending on the outfitting requirements or outfitting line.

The invention claimed is:

1. A container for installation in an interior of a motor vehicle, the container comprising:
  a gear;
  a spring device having a torsion spring with first and second ends;
  a cylindrical shaft having an outer circumference and supporting the first end of the torsion spring;
  a movable pin;
  a housing supporting the second end of the torsion spring;
  a lid mounted pivotably on said housing and connected operatively via said gear to said spring device prestressing said lid in an opening direction and supported on said housing; and
  a cardioid control for moving and locking said lid, said cardioid control having a cardioid disposed continuously on said outer circumference of said cylindrical shaft and co-operates with said movable pin disposed on a housing side.

2. The container according to claim 1, further comprising at least one damping device for damping an opening movement of said lid.

3. The container according to claim 2, wherein said at least one damping device is a silicone brake.

4. The container according to claim 1, further comprising an adjusting device for tolerance compensation of said moveable pin disposed on said housing side and co-operating with said cardioid of said cardioid control.

5. The container according to claim 4, wherein said adjusting device is an adjusting screw.

6. The container according to claim 1, wherein the container is selected from group consisting of a beverage container, a storage compartment and an ashtray.

7. A container for installation in an interior of a motor vehicle, the container comprising:
  a gear;
  a spring device;
  a cylindrical shaft having an outer circumference and supporting said spring device;
  a movable pin;
  a housing;
  a lid mounted pivotably on said housing and connected operatively via said gear to said spring device prestressing said lid in an opening direction and supported on said housing;
  a lid leg;
  a toothed quadrant disposed on said lid leg;
  a gearwheel disposed at at least one longitudinal end of said cylindrical shaft, said gearwheel is connected fixedly in terms of rotation to said cylindrical shaft and meshes with said toothed quadrant; and
  a cardioid control for moving and locking said lid, said cardioid control having a cardioid disposed continuously on said outer circumference of said cylindrical shaft and co-operates with said movable pin disposed on a housing side.

8. The container according to claim 7, further comprising two housing-side guide rollers, said lid leg is guided, on the one hand, by said gearwheel and, on the other hand, y said two-housing-side guide rollers.

9. The container according to claim 7, wherein said lid leg is of a curved design.

10. The container according to claim 7, wherein said lid has a carrier, produced in one piece with said lid leg, and a decorative element connectable to said carrier.

11. The container according to claim 7, wherein said lid has a carrier, produced in one piece with said lid leg, and a decorative element snappable, to said carrier.

12. A container for installation in an interior of a motor vehicle, the container comprising:
  a gear;
  a spring device;
  a cylindrical shaft having an outer an outer circumference and supporting said spring device;
  a movable pin;
  a housing;
  an axle disposed co-axially within said cylindrical shaft and fixed to said housing, said spring device having a torsion spring with a first end supported on said axle an a second end on said housing;
  a lid mounted pivotably on said housing and connected operatively via said gear to said spring device prestressing said lid in an opening direction and supported on said housing; and
  a cardioid control for moving and locking said lid, said cardioid control having a cardioid disposed continuously on said outer circumference of said cylindrical shaft and co-operates with said movable pin disposed on a housing side.

* * * * *